(12) United States Patent
Cavanna et al.

(10) Patent No.: US 11,797,177 B2
(45) Date of Patent: Oct. 24, 2023

(54) PROVIDING A GLOBAL UNIQUE IDENTIFIER FOR A STORAGE VOLUME

(71) Applicant: INTERNATIONAL BUSINES MACHINES CORPORATION, Armonk, NY (US)

(72) Inventors: Carlos D. Cavanna, Toronto (CA); Rafael Velez, Cedar Park, TX (US); Hamdi Roumani, Toronto (CA); Zixi Gu, Mississauga (CA); Jeffrey Bloom, Bellingham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 16/189,267

(22) Filed: Nov. 13, 2018

(65) Prior Publication Data

US 2020/0125266 A1 Apr. 23, 2020

Related U.S. Application Data

(63) Continuation of application No. 16/163,017, filed on Oct. 17, 2018.

(51) Int. Cl.
*G06F 3/06* (2006.01)
*H04L 41/12* (2022.01)
*G06F 16/182* (2019.01)

(52) U.S. Cl.
CPC ............ *G06F 3/0604* (2013.01); *G06F 3/067* (2013.01); *G06F 3/0626* (2013.01);
(Continued)

(58) Field of Classification Search
CPC ...... G06F 3/067; G06F 16/182; G06F 3/0604; G06F 3/0635; G06F 3/0626;
(Continued)

(56) References Cited

U.S. PATENT DOCUMENTS 6,175,900 B1 1/2001 Forin et al.
6,751,667 B1 * 6/2004 Helliwell ............ H04L 29/1232
708/250

(Continued)

FOREIGN PATENT DOCUMENTS

WO 2015084144 6/2015

OTHER PUBLICATIONS

Kernel Korner—ATA Over Ethernet Putting Hard Drives on the LAN by Cashin (Year: 2005).*

(Continued)

*Primary Examiner* — Paul M Knight
(74) *Attorney, Agent, or Firm* — KONRAD RAYNES DAVDA & VICTOR LLP; Janaki K. Davda

(57) ABSTRACT

Provided are techniques for providing a global unique identifier for a storage volume. Under control of a storage initiator, a Global Universally Unique Identifier (GUUID) is identified for a storage volume of a storage device in a cloud system storing a plurality of storage devices, wherein the GUUID is generated for use with an ATA over Ethernet (AoE) protocol. The GUUID is stored in bytes of a packet header structure. Metadata is stored in remaining portions of the packet header structure. A request with the packet header structure is sent to a storage target.

20 Claims, 14 Drawing Sheets

(52) U.S. Cl.
CPC .......... *G06F 3/0635* (2013.01); *G06F 3/0665* (2013.01); *G06F 16/182* (2019.01); *H04L 41/12* (2013.01)

(58) Field of Classification Search
CPC .... G06F 3/0607; G06F 3/0665; G06F 3/0632; G06F 16/122; H04L 41/12
See application file for complete search history.

(56) References Cited

U.S. PATENT DOCUMENTS

| | | | |
|---|---|---|---|
| 7,685,178 B2 | 3/2010 | Rajan | |
| 7,882,081 B2* | 2/2011 | Stager | G06F 16/10 707/691 |
| 8,782,463 B1 | 7/2014 | Singh | |
| 2004/0054777 A1 | 3/2004 | Ackaouy et al. | |
| 2004/0220960 A1 | 11/2004 | Ojeil et al. | |
| 2005/0228824 A1* | 10/2005 | Gattuso | G06Q 10/00 |
| 2007/0030805 A1 | 2/2007 | Pantelias et al. | |
| 2007/0244986 A1* | 10/2007 | Svendsen | G11B 27/034 709/217 |
| 2008/0065587 A1 | 3/2008 | Iwasaki et al. | |
| 2009/0282046 A1 | 11/2009 | Isaacson et al. | |
| 2010/0146013 A1* | 6/2010 | Mather | G06F 16/10 707/803 |
| 2011/0208851 A1 | 8/2011 | Frost | |
| 2013/0091333 A1* | 4/2013 | Marisamy | G06F 11/1448 711/162 |
| 2013/0117780 A1* | 5/2013 | Sukthankar | G06K 9/00718 725/32 |
| 2013/0346718 A1 | 12/2013 | Meshchaninov et al. | |
| 2014/0095826 A1* | 4/2014 | Rajagopal | G06F 3/0605 711/170 |
| 2014/0149794 A1* | 5/2014 | Shetty | H04L 67/1095 714/20 |
| 2014/0282943 A1* | 9/2014 | Nikankin | H04L 63/0884 726/6 |
| 2015/0012704 A1 | 1/2015 | Watanabe et al. | |
| 2016/0292250 A1 | 10/2016 | Chen et al. | |
| 2016/0308723 A1 | 10/2016 | Ganguli et al. | |
| 2017/0180824 A1* | 6/2017 | Casey | H04N 21/8352 |
| 2017/0300248 A1* | 10/2017 | Purohit | G06F 3/067 |
| 2017/0364601 A1 | 12/2017 | Charles et al. | |
| 2018/0011650 A1 | 1/2018 | Litke et al. | |
| 2018/0262567 A1 | 9/2018 | Klein | |
| 2018/0314719 A1 | 11/2018 | Subramanian et al. | |
| 2019/0005065 A1* | 1/2019 | Debnath | G06F 16/183 |
| 2020/0125264 A1 | 4/2020 | Cavanna et al. | |

OTHER PUBLICATIONS

What Is Cloud Computing? by Griffith (Year: 2016).*
AoE (ATA over Ethernet) by Hopkins (Year: 2009).*
What is MAC Address? by RFWireless (Year: 2016).*
List of IBM patents and applications treated as related, dated Nov. 13, 2018, pp. 2.
Office Action dated Dec. 23, 2019, pp. 29, for U.S. Appl. No. 16/163,017.
Response dated Mar. 20, 2020, pp. 11 to Office Action dated Dec. 23, 2019, for U.S. Appl. No. 16/163,017.
P. Leach, "A Universally Unique IDentifier (UUID) URN Namespace", Microsoft, Jul. 2005, pp. 32.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, pp. 80.
Mell, P. and T. Grance, "The NIST Definition of Cloud Computing (Draft)", Sep. 2011, Computer Security Division Information Technology Laboratory National Institute of Standards and Technology, pp. 7.
B. Coile, et al., "The ATA over Ethernet Protocol", created Oct. 1, 2004, pp. 6.
"ATA over Ethernet", Wikipedia, [online][retrieved Aug. 27, 2018], https://en.wikipedia.org/wiki/ATA_over_Ethernet, pp. 5.
"Universally unique identifier", Wikipedia, [online][retrieved Aug. 26, 2018],https://en.wikipedia.org/wiki/Universally_unique_identifier, pp. 10.
U.S. Appl. No. 16/163,017, filed Oct. 17, 2018.
Final Office Action dated Jun. 1, 2020, pp. 27, for U.S. Appl. No. 16/163,017.
M. Simonsen, "Displaying The Volume GUID of a Volume", Morgen Simonsen's Blog, Jan. 26, 2009, pp. 5.
Response to Office Action dated Dec. 22, 2020, pp. 16, for U.S. Appl. No. 16/163,017.
Response dated Aug. 21, 2020, pp. 14, to Final Office Action dated Jun. 1, 2020, pp. 27, for U.S. Appl. No. 16/163,017.
Office Action dated Sep. 22, 2020, pp. 25, for U.S. Appl. No. 16/163,017.
P. Leach, et al., "A Universally Unique IDentifier (UUID) URN Namespace", The Internet Society, 2005, pp. 32, [online][retrieved Nov. 2, 2020] https://tools.ietf.org/html/rfc4122.
Wang, et al., "Rethink the Virtual Machine Template", ACM, VEE11, Mar. 9-11, 2011, pp. 11.
Notice of Allowance dated Jun. 3, 2021, pp. 22, for U.S. Appl. No. 16/163,017.
Final Office Action dated Feb. 26, 2021, pp. 30, for U.S. Appl. No. 16/163,017.
Response dated Apr. 21, 2021, pp. 17, to Final Office Action dated Feb. 26, 2021, pp. 30, for U.S. Appl. No. 16/163,017.

* cited by examiner

```
UUID = time-low "-" time-mid "-" time-high-and-version "-" clock-seq-and-reserved "-"
clock-seq-low "-" node where, time-low = 4hexOctet time-mid = 2hexOctet time-high-and-version = 2hexOctet clock-seq-and-reserved = hexOctet clock-seq-low = hexOctet node = 6hexOctet hexOctet = hexDigit hexDigit hexDigit = "0" / "1" / "2" / "3" / "4" / "5" / "6" / "7" / "8" / "9" /
"a" / "b" / "c" / "d" / "e" / "f" /
"A" / "B" / "C" / "D" / "E" / "F"
```

FIG. 2

PROVIDING A GLOBAL UNIQUE IDENTIFIER FOR A STORAGE VOLUME

BACKGROUND

1. Field of the Invention

Embodiments of the invention relate to providing a global unique identifier for a storage volume.

2. Description of the Related Art

Data centers provide many types of resources, including, storage resources. Storage volumes live inside storage targets (storage nodes or storage server nodes). Each storage target has an identifier. Furthermore, storage volumes have identifiers that are unique to each storage target. As data centers grow, so do the number of storage resources that the data centers have to manage. The management of storage volumes in a data center becomes very complex as the number of storage volumes increases.

Consequently, handling the storage volumes efficiently becomes important to avoid scalability issues or bottlenecks. A current solution in the market centralizes the handling of these storage volumes into a higher-level entity, such as a resource manager. The resource manager is responsible for allocating and managing these unique identifiers, which moves away the problem of managing the storage volumes from the storage targets to a single higher-level entity in the data center.

When new volumes are created and attached to user virtual machines, the resource manager has to perform all the coordination between different storage targets in the data center and keep track of the resources consumed by the storage targets.

This process requires a significant amount of communication between nodes, which scales linearly (O(n)). In addition, it is necessary to consider access time to the database tables that store the information about the resources consumed by the storage targets.

Having an identifier of the form <storage target>.<volume id> is not feasible because volumes need to be unequivocally identified in the entire network so that customer virtual machines can identify and attach to these storage volumes. At the same time, however, storage volumes may be migrated from one storage target to another storage target. For example, a data center should enable customers to access their resources if there are failures in a storage target (e.g., in a local region) or if a storage target needs to be shut down for maintenance (e.g., in a local or remote region). Using the storage target as part of the identifier would hinder the capability of the data center to dynamically migrate storage volumes from a storage target to another storage target.

In ATA over Ethernet (AoE), each AoE target may have a maximum of 256*65535 unique storage volumes, which may not be enough for a large data center deployment.

An architecture of a layer-2 storage network has two main components: an AoE initiator (storage initiator) and an AoE target (storage target). The AoE target has a storage pool of storage devices. The AoE target exports the storage devices, and the AoE initiator discovers and attaches to the storage devices.

Typically, the AoE target provides a maximum number of 256*65536 storage volumes. The storage volumes are identified by a combination of two numbers, called shelf and slot. The AoE devices are represented as EX.Y, where X is the shelf and Y is the slot. For example, an AoE target may export three storage devices called E0.1 (shelf: 0, slot: 1), E0.2 (shelf: 0, slot: 2) and E0.3 (shelf 0, slot:3).

There may be an architecture with multiple AoE initiators and multiple AoE targets. In such an architecture, a resource manager is coupled to the multiple AoE targets. In a data center, several (if not all) AoE targets may be located in the same subnet, and communication happens at network layer 2. The AoE protocol is designed to be used in a network in which the shelf and slot are unique exported values in the network. This avoids collisions between the names of exported volumes. In conventional data centers, the resource manager coordinates the numbers used for shelf and slot among the AoE targets to guarantee that they are unique across the data center.

Moreover, creating a separate cluster of AoE targets (with their own namespace) introduces a problem of coordination between them across regions or data centers.

The data center business is growing, and the demands for more storage and more computing capacity make the scaling problem more complex every time.

SUMMARY

Provided is a computer program product for providing a global unique identifier for a storage volume. The computer program product comprises a computer readable storage medium having program code embodied therewith, the program code executable by at least one processor to perform operations. Under control of a storage initiator, a Global Universally Unique Identifier (GUUID) is identified for a storage volume of a storage device in a cloud system storing a plurality of storage devices, wherein the GUUID is generated for use with an ATA over Ethernet (AoE) protocol. The GUUID is stored in bytes of a packet header structure. Metadata is stored in remaining portions of the packet header structure. A request with the packet header structure is sent to a storage target.

Provided is a computer system for providing a global unique identifier for a storage volume. The computer system comprises one or more processors, one or more computer-readable memories, one or more computer-readable, tangible storage devices, and program instructions, stored on at least one of the one or more computer-readable, tangible storage devices for execution by at least one of the one or more processors via at least one of the one or more memories, to perform operations. Under control of a storage initiator, a Global Universally Unique Identifier (GUUID) is identified for a storage volume of a storage device in a cloud system storing a plurality of storage devices, wherein the GUUID is generated for use with an ATA over Ethernet (AoE) protocol. The GUUID is stored in bytes of a packet header structure. Metadata is stored in remaining portions of the packet header structure. A request with the packet header structure is sent to a storage target.

Provided is a computer-implemented method for providing a global unique identifier for a storage volume. Under control of a storage initiator, a Global Universally Unique Identifier (GUUID) is identified for a storage volume of a storage device in a cloud system storing a plurality of storage devices, wherein the GUUID is generated for use with an ATA over Ethernet (AoE) protocol. The GUUID is stored in bytes of a packet header structure. Metadata is stored in remaining portions of the packet header structure. A request with the packet header structure is sent to a storage target.

Embodiments advantageously use a GUUID, instead of a shelf and slot, in a packet header structure for an AoE protocol.

In certain embodiments, the request is any one of a request to store data in the storage volume and a request to retrieve data from the storage volume. Such embodiments advantageously allow for use of the packet header structure with the GUUID for either storing data or retrieving data.

In other embodiments, the storage initiator is coupled to the storage target, and wherein the storage target receives the request with the packet header structure, retrieves the GUUID, associates the GUUID to a storage volume, processes the request, and returns a response to the storage initiator using the packet header structure. Such embodiments advantageously allow the storage initiator to communicate with the storage target using the packet header structure with the GUUID.

In yet other embodiments, the GUUID is generated by the storage target when the storage target creates the storage volume without coordination with other storage targets. Such embodiments advantageously allow the storage target to generate the GUUID without coordination with other storage target, while still generating a unique identifier that does not conflict with identifiers other storage targets have assigned their own storage volumes.

In additional embodiments, the storage target sends the GUUID to cloud orchestration services, and wherein the cloud orchestration services stores the GUUID in a database. Such embodiments advantageously allow for the GUIID to be stored centrally in the database.

In yet additional embodiments, the storage initiator requests a list of volumes from any one of the storage target and cloud orchestration services and receives the list of volumes, where the volume in the cloud system is selected from the list of volumes. Such embodiments advantageously enable the storage initiator to obtain the list of volumes from the storage target or from the cloud orchestration services.

In further embodiments, the metadata in the remaining portions of the packet header structure includes a source address field, a destination address field, a type field, a version field, a flags field, an error field, a class field, and a tag field. Such embodiments advantageously provide information in the packet header structure to allow communication of a request from the storage initiator to the storage target and of a response from the storage target to the storage initiator.

In yet further embodiments, the storage initiator, the storage target, the storage device, and a cloud management node that includes cloud orchestration services are in the cloud system. Such embodiments advantageously allow for use of the packet header structure with the GUUID in a cloud system.

In alternative embodiments, provided is a computer program product for providing a global unique identifier for a storage volume. The computer program product comprises a computer readable storage medium having program code embodied therewith, the program code executable by at least one processor of a storage target to perform operations. For each storage volume of a plurality of storage volumes, a Global Universally Unique Identifier (GUUID) is generated. In response to a request for the plurality of storage volumes, the GUUID of each of the storage volumes is provided. In response to a receiving a request that specifies a GUUID in a packet header structure, the GUUID from the packet header structure is retrieved, the GUUID is associated to a storage volume of the plurality of storage volumes, the request is processed, and a response is returned using the packet header structure that specifies the GUUID.

In the alternative embodiments, provided is a storage target (e.g., a computer system) for providing a global unique identifier for a storage volume. The storage target comprises one or more processors, one or more computer-readable memories, one or more computer-readable, tangible storage devices, and program instructions, stored on at least one of the one or more computer-readable, tangible storage devices for execution by at least one of the one or more processors via at least one of the one or more memories, to perform operations. For each storage volume of a plurality of storage volumes, a Global Universally Unique Identifier (GUUID) is generated. In response to a request for the plurality of storage volumes, the GUUID of each of the storage volumes is provided. In response to a receiving a request that specifies a GUUID in a packet header structure, the GUUID from the packet header structure is retrieved, the GUUID is associated to a storage volume of the plurality of storage volumes, the request is processed, and a response is returned using the packet header structure that specifies the GUUID.

In the alternative embodiments, provided is a method implemented in a storage target (e.g., a computer) for providing a global unique identifier for a storage volume. For each storage volume of a plurality of storage volumes, a Global Universally Unique Identifier (GUUID) is generated. In response to a request for the plurality of storage volumes, the GUUID of each of the storage volumes is provided. In response to a receiving a request that specifies a GUUID in a packet header structure, the GUUID from the packet header structure is retrieved, the GUUID is associated to a storage volume of the plurality of storage volumes, the request is processed, and a response is returned using the packet header structure that specifies the GUUID.

Embodiments advantageously enable a storage target to independently generate a GUUID for each storage volume in a plurality of storage volumes. This avoids the need for a central system to generate a GUUID for a storage volume or for storage targets to coordinate with each other to generate a GUUID for a storage volume.

In certain of the alternative embodiments, the request is any one of a request to store data in the storage volume and a request to retrieve data from the storage volume. Such embodiments advantageously allow for use of the packet header structure with the GUUID for either storing data or retrieving data.

In other of the alternative embodiments, each GUUID is generated when each storage volume of the plurality of storage volumes is created. This allows for creation of a GUUID as needed.

In yet other of the alternative embodiments, each GUUID is stored in a database with a path to the storage target and a size of the storage volume. Such embodiments advantageously allow for the GUIID to be stored centrally in the database.

In additional of the alternative embodiments, the metadata in remaining portions of the packet header structure includes a source address field, a destination address field, a type field, a version field, a flags field, an error field, a class field, and a tag field. Such embodiments advantageously provide information in the packet header structure to allow communication of a request from a storage initiator to the storage target and of a response from the storage target to the storage initiator.

In further of the alternative embodiments, the storage target is part of a cloud system, and wherein the storage target generates each GUUID independently. Such embodiments advantageously allow for independent generation of the GUUID by the storage target in a cloud system.

BRIEF DESCRIPTION OF THE SEVERAL VIEWS OF THE DRAWINGS

Referring now to the drawings in which like reference numbers represent corresponding parts throughout:

FIG. 2 illustrates a format of a Global Universally Unique Identifier (GUUID) representation in accordance with certain embodiments.

DETAILED DESCRIPTION

Figure 1:
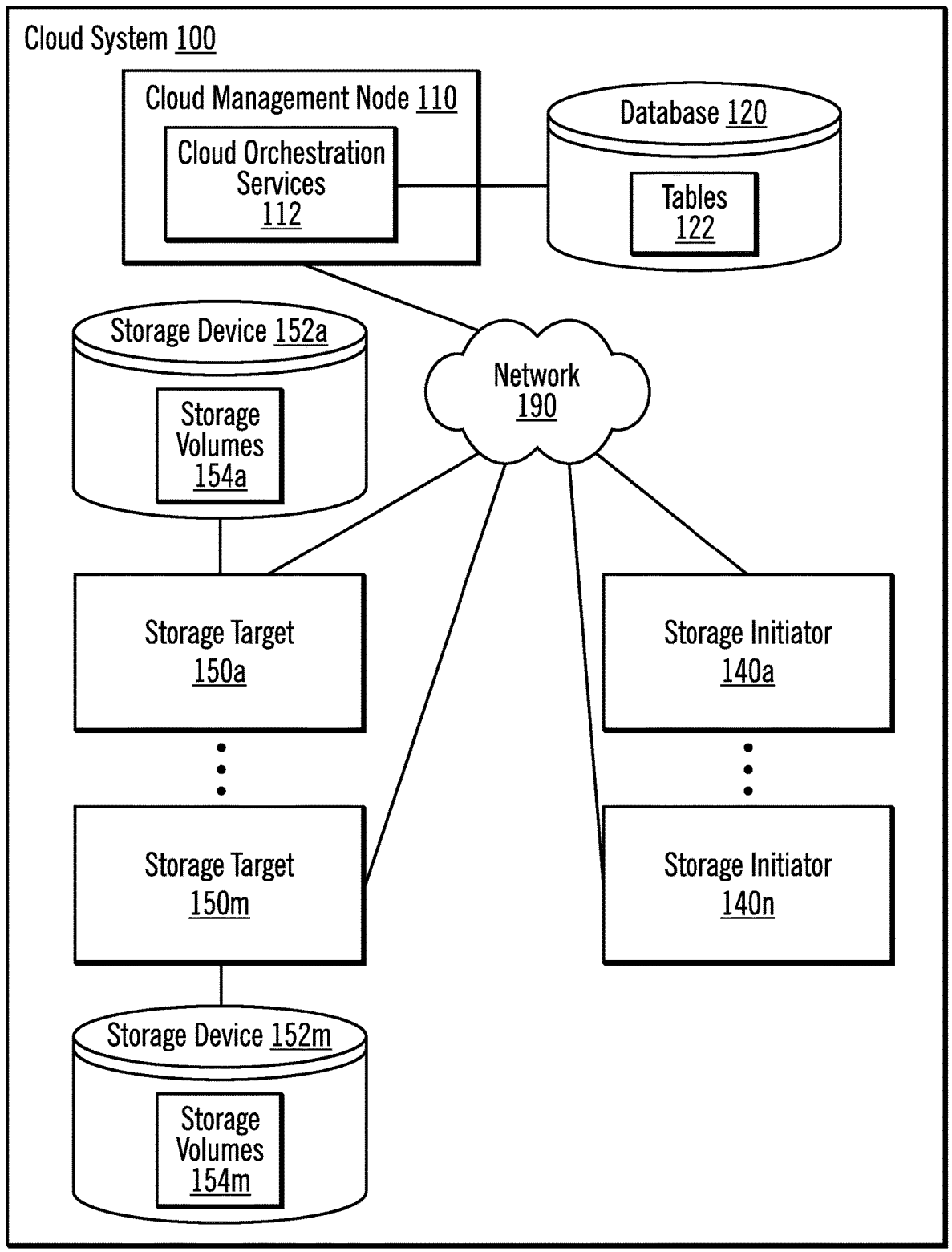
FIG. 1 illustrates, in a block diagram, a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments allocate and use a Global Universally Unique Identifier (GUUID) as a volume identifier for a volume in a storage device in a cloud system. In certain embodiments, the cloud system is a cloud infrastructure that includes multiple data centers, which are known as regional zones. In various embodiments, various techniques may be used to generate the GUUID. Embodiments also modify the transmission protocol and the addressing techniques on the storage initiator and storage target to allow the use of this unique identifier.

With embodiments, the management and resource allocation is advantageously simplified on the cloud resource manager and is limited to a single GUUID generation and its mapping to the new volume created.

In addition, the management of GUUID is simplified in several levels. For example, there is no coordination among storage targets to generate the unique identifier for a storage volume and no coordination for the discovery process on the storage initiator to find the storage volume.

Embodiments also modify the rest of the cloud implementation to work with this new GUUID. In certain embodiments, the packets related to storage actions are transported by the network layer (level 2), and the AoE protocol on the storage initiator and the storage target is modified to properly read and process the GUUID on each packet.

Embodiments advantageously decentralize the task of allocating and managing unique identifiers for storage volumes across storage targets and avoid converging this responsibility into a single system/entity, such as a resource manager.

Embodiments use a volume identifier that guarantees (with a very safe degree of probability) that each storage volume is uniquely named across the data center network, without the use of a resource manager. This advantageously makes the problem of scaling the storage volumes easier to handle and reduces the complexity of the data center management. In certain embodiments, whenever new storage volumes are to be added in any region or data center, almost no additional resource manager intervention is required.

Embodiments advantageously solve the limitations present in the ATA over Ethernet (AoE) protocol with respect to a maximum number of unique storage volumes that may be presented to the cloud system. Embodiments provide unique volume identifiers to solve the scaling process by removing the limitation of the total number of identifiers on each storage target and simplifying the coordination between the storage targets.

FIG. 1 illustrates, in a block diagram, a computing environment in accordance with certain embodiments. A cloud system 100 includes a cloud management node 110, storage initiators 140$a$ . . . 140$n$, and storage targets 150$a$ . . . 150$m$ coupled to each other via a network 190. The storage initiators 140$a$ . . . 140$n$ may be AoE initiators, client nodes or storage client nodes. The storage targets 150$a$ . . . 150$m$ may be AoE targets, storage nodes or storage server nodes. The cloud management node 110 includes a cloud management module 112 and is coupled to a database 120 with tables 122. In certain embodiments, the cloud management module 112 stores GUUIDs for storage volumes in the database 120. Each storage target 150$a$ . . . 150$m$ is coupled to at least one storage device 152$a$ . . . 152$m$. Each storage device 152$a$ . . . 152$m$ stores storage volumes 154$a$ . . . 154$m$. Each storage target 150$a$ . . . 150$m$ has an identifier, and embodiments provided GUIIDs for the volumes 154$a$ . . . 154$m$.

The storage devices 152$a$ . . . 152$m$ may be comprised of one or more sequential access storage devices, such as hard disk drives and magnetic tape or may include non-sequential access storage devices such as solid state drives (SSD), for example. Each storage device may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The volumes 154a . . . 154m may be, for example, Logical Unit Numbers, Logical Devices, Logical Subsystems, etc.

The network 190 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The cloud orchestration services (e.g., resource manager) generate a GUUID, which is based on UUID generation (Universally Unique Identifier). In certain embodiments, the GUUID consists of a 128-bit number generated that guarantees uniqueness within the cloud system. The generation of this identifier is random and does not create any conflict with other generated GUUIDs. This GUUID (Global Universally Unique Identifier) is assigned to a storage volume. The storage target creates the storage volume using the GUUID. The GUUID for the storage volume is used by the storage initiator (e.g., customer virtual machine) when sending a request to the storage target managing that storage volume.

As for UUID uniqueness, embodiments take various factors into account. Mathematically, the probability of collisions is sufficiently close to zero, even when the generation rates are extremely high, that is rates that exceed generating a new UUID to represent a block storage datapath for every possible datapath in a cloud scale deployment. Moreover, the use of UUIDs is prevalent in the industry across many different application domains when global uniqueness is required. In certain embodiments, collisions of identifiers may be a result of flaws in the UUID generation technique, and it is important that cryptographically-strong random numbers are created (e.g., by the storage targets that generate the GUUIDs using, for example, third-party tools) to avoid such collisions. With embodiments, for there to be a one in a billion chance of duplication of identifiers, 103 trillion versions of UUIDs would be generated.

FIG. 2 illustrates a format of a GUUID representation 200 in accordance with certain embodiments. The GUUID representation includes values for: time-low, time-mid, time-high-and-version, clock-seq-and-reserved, clock-seq-low, and node. The following is an example of a GUUID:

0fb21ccc-5c1a-11e7-84d0-2fa91f04d065

As the size of the cloud system increases (and therefore the demand for storage increases), a single resource manager may be problematic. If there are collisions with the identifiers (that is, more than one volume present themselves with the same shelf/slot combination), the initiator is not able to differentiate between the two volumes and only one (any of them) of the conflicting volumes is presented to the operating system of the storage initiator.

Embodiments solve this problem by decentralizing the function of identifier allocation, with changes in the AoE protocol, target and initiator. Embodiments generate a single volume identifier, composed by 6 bytes ($2^{48}$ volumes) GUUID that provides a global unique (with a very high degree of certainty) identifier. The number generator uses proper random numbers. This GUUID replaces the shelf and slot numbers. In this manner, each storage target manages its own GUUID values and does not have to coordinate with the other storage targets in the rest of the cloud system.

Embodiments advantageously provide protocol and packet header changes. The AoE protocol has three different types of messages: ATA messages, Query messages, and Config messages. They share a common packet header. The packet header contains the information to deliver the packets between the storage initiator and the storage target. The ATA messages are for requests and responses. With ATA messages, no data may be transferred between the storage initiator and the storage target, the storage initiator may send data to the storage target for storage (in which case the storage target writes data to the storage volume) or the storage initiator may request data from the storage target (in which case the storage target reads data from the storage volume and returns that data to the storage initiator). The Query messages query data, while the Config messages set data.

Figure 3:
FIG. 3 illustrates a packet header structure for an AoE protocol in accordance with certain embodiments.

FIG. 3 illustrates a packet header structure 300 in accordance with certain embodiments. The packet header structure 300 includes a first header (an Ethernet header) of the first 14 bytes and a second header (an AoE header) of the following 10 bytes.

In the packet header structure 300, the first header includes:

an Ethernet destination address (6 bytes): XX:XX:XX:XX:XX:XX an Ethernet source address (6 bytes): XX:XX:XX:XX:XX:XX an Ethernet Type (2 bytes): XX:XX In the packet header structure 300, the second header includes:

Version (1 byte): XX

R (1 bit): 1 or 0

E (1 bit): 1 or 0

0 (1 bit): 0

0 (1 bit): 0

Error (1 byte): XX

Shelf (2 bytes): XX:XX

Slot (1 byte): XX

Class (1 byte): XX

Tag (4 byte): XX:XX:XX:XX

The packet header structure 300 provides the Ethernet address of the storage target (Ethernet destination address) and the storage initiator (Ethernet source address), along with an Ethernet type (e.g., AoE may have a registered Ethernet type of 0x88A2). The version field defines the header format and command codes.

The flags field is four bits: R, E, 0, 0. In certain embodiments, "R" is set to 0 by the storage initiator to indicate a request, and "R" is set to 1 by the storage target to indicate a response. "E" is set to 1 by the storage target for a response to indicate that there was an error in generating the response. The other bits may be set to zero and are reserved.

The Error field contains error information when "E" is set to 1. The Shelf and Slot fields identify the shelf and slot. The class field is set to zero for ATA messages and is set to 1 for Query messages and Config messages.

The storage initiator uses the tag field for the request. Then, the storage target returns data with the packet header having the same tag field, which may be used by the storage initiator to map the response to the original request.

Figure 4:
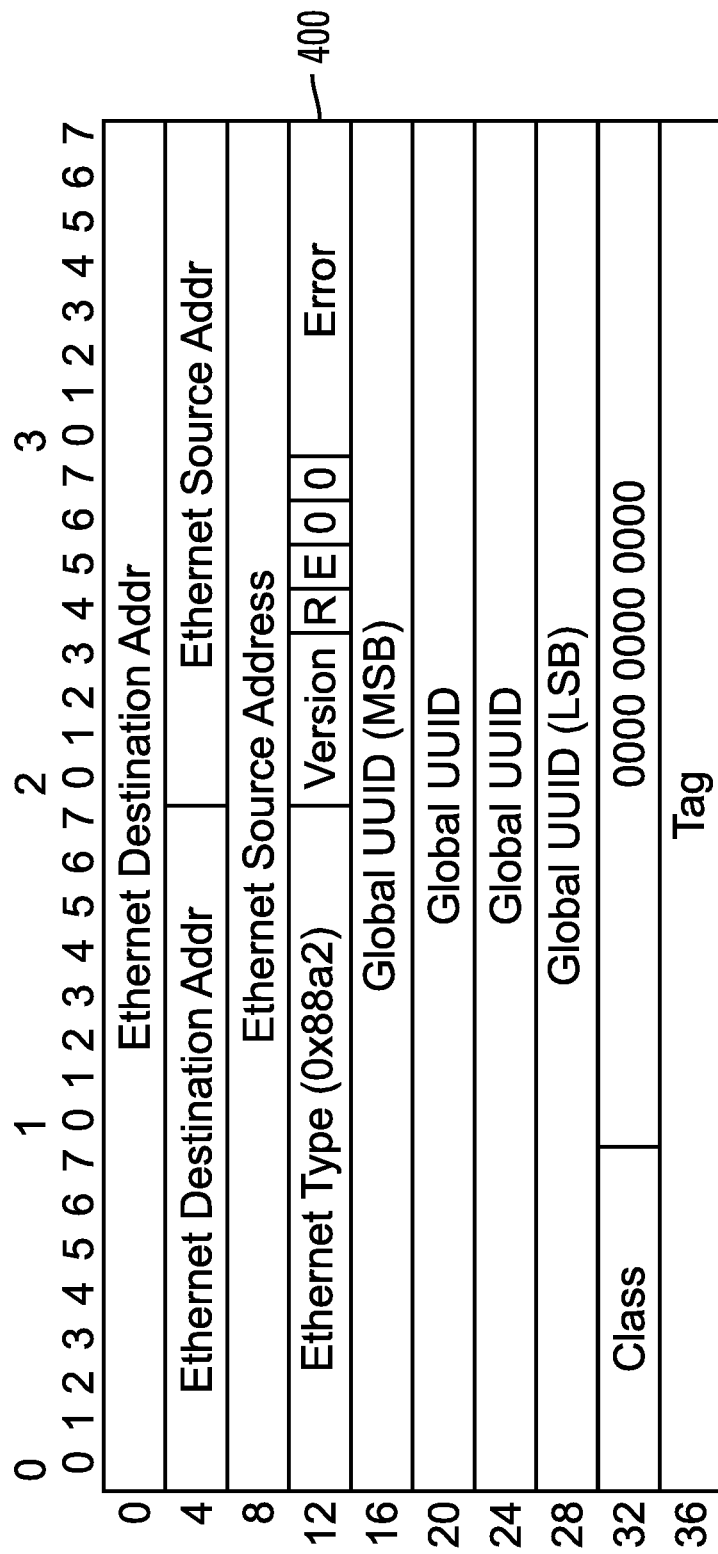
FIG. 4 illustrates a new packet header structure for the AoE protocol in accordance with certain embodiments.

Embodiments modify the second header of the packet header structure 300 so that the shelf and slot are replaced with the 16-byte GUUID. FIG. 4 illustrates a new packet header structure 400 in accordance with certain embodiments. The new packet header structure 400 includes a first header (an Ethernet header) of the first 14 bytes and a second header (an AoE header) of the following 10 bytes. Thus, the first header is not modified from the packet header structure 300. However, the second header is now larger (26 bytes rather than 10 bytes) and includes the GUUID.

In the packet header structure 400, the first header includes:
  an Ethernet destination address (6 bytes): XX:XX:XX: XX:XX:XX
  an Ethernet source address (6 bytes): XX:XX:XX:XX: XX:XX
  an Ethernet Type (2 bytes): XX:XX In the packet header structure 400, the second header includes:
  Version (1 byte): XX
  R (1 bit): 1 or 0
  E (1 bit): 1 or 0
  0 (1 bit): 0
  0 (1 bit): 0
  Error (1 byte): XX
  Global UUID (Most Significant Byte (MSB)) (4 bytes)
  Global UUID (8 bytes)
  Global UUID (Least Significant Byte (LSB)) (4 bytes)
  Class (1 byte): XX
  0000 0000 0000 (3 bytes) (used for alignment and reserved for other future uses)
  Tag (4 byte): XX:XX:XX:XX In certain embodiments, the GUUID in the second header of the new packet header structure 400 is 16 bytes in little endian byte order.

In certain embodiments, the GUUID is generated in a decentralized way. However, in other embodiments, the GUUID may be generated in a centralized way using the resource manager. Unlike the case with Shelf and Slot, having the generation in the resource manager will still be a scalable solution because it does not require any coordination between different invocations of the generator.

The changes in the storage initiator and storage target are the routing packets and naming convention. The storage devices are presented on the storage initiator using the GGUID, and the storage target creates these storage devices using the GUUID. In addition, the packet addressing between the storage initiator and the storage target is changed to use the new GUUID format (packet header structure 400) instead of the old Shelf/Slot format (packet header structure 300).

Figure 5:
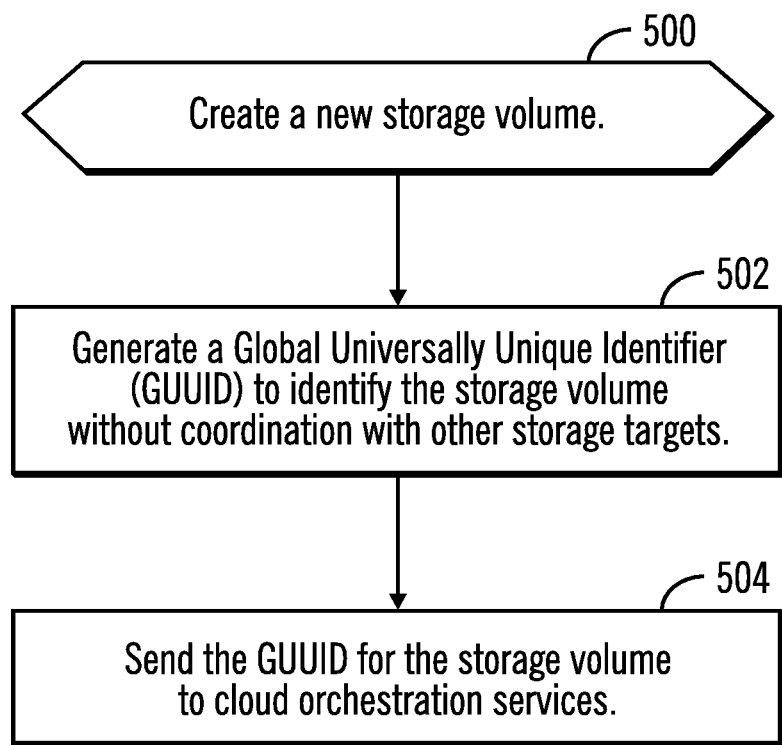
FIG. 5 illustrates, in a flowchart, operations for creating, with a storage target, a storage volume in accordance with certain embodiments.

FIG. 5 illustrates, in a flowchart, operations for creating, with a storage target, a storage volume in accordance with certain embodiments. Control begins at block 500 with the storage target creating a new storage volume. In block 502, the storage target generates a GUUID to identify the storage volume without coordination with other storage targets. In block 504, the storage target sends the GUUID for the storage volume to the cloud orchestration services.

Figure 6:
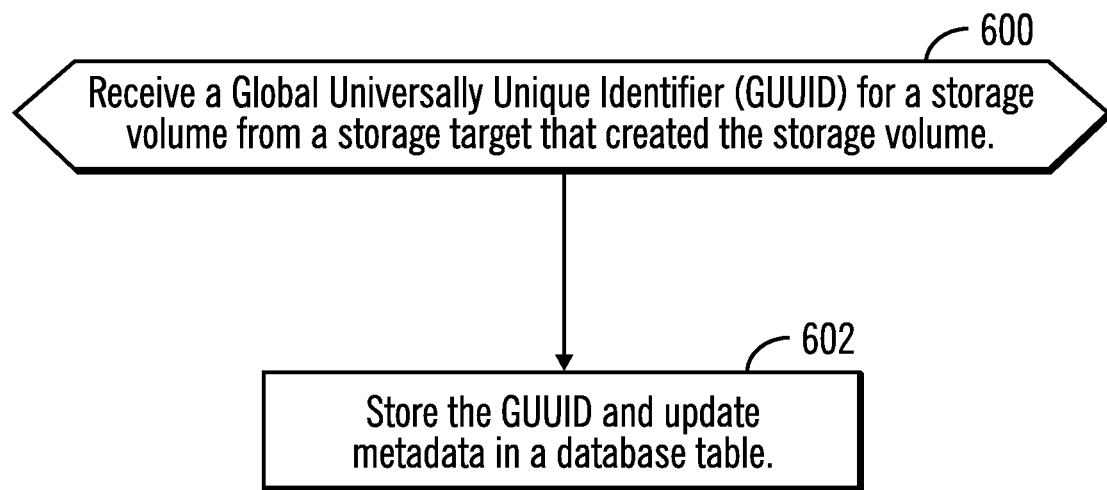
FIG. 6 illustrates, in a flowchart, operations for storing a GUUID, with a cloud management module, in accordance with certain embodiments.

FIG. 6 illustrates, in a flowchart, operations for storing a GUUID, with a cloud orchestration services, in accordance with certain embodiments. In block 600, the cloud orchestration services receives a GUUID for a storage volume from the storage target that created the storage volume. In block 602, the cloud orchestration services stores the GUUID and updates metadata in a database table. The metadata includes a path to the storage target that created and manages the storage volume, a size of the storage volume, other metadata about the storage volume (e.g., type of file system, replication factor/technique, etc.), etc.

Figure 7:
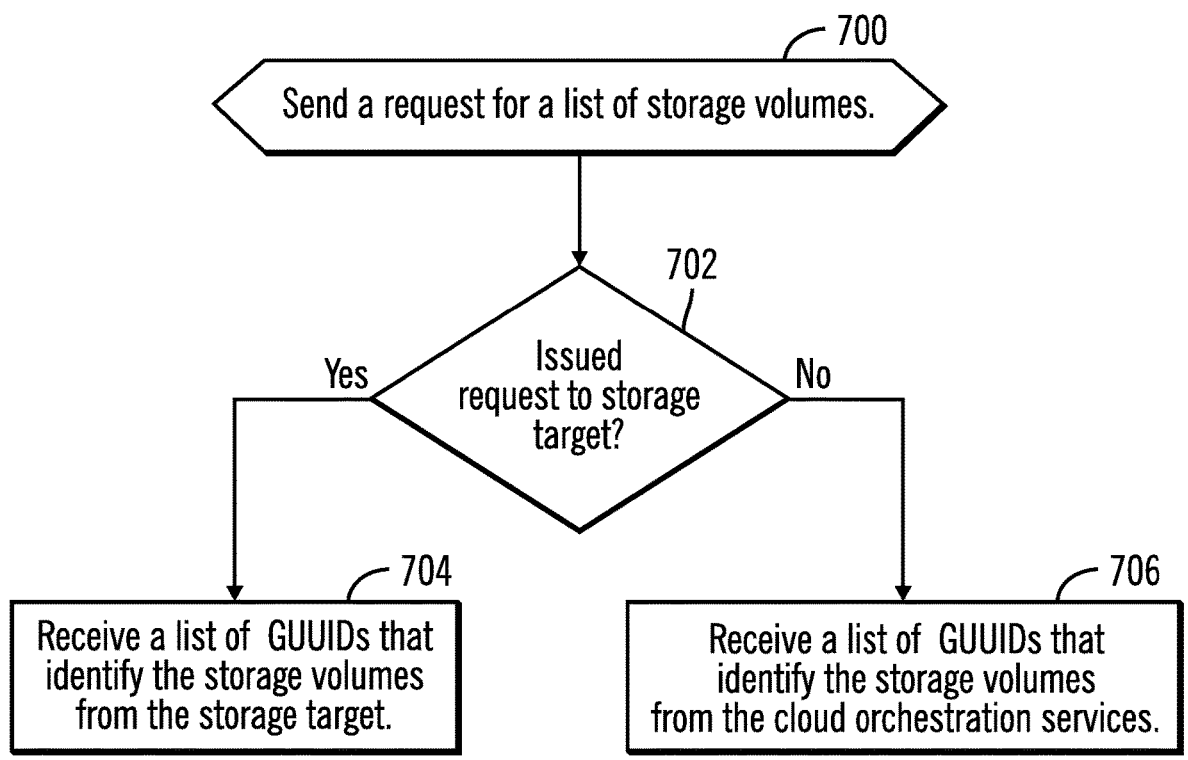
FIG. 7 illustrates, in a flowchart, operations for issuing a request for storage volumes, with a storage initiator, in accordance with certain embodiments.

FIG. 7 illustrates, in a flowchart, operations for issuing a request for storage volumes, with a storage initiator, in accordance with certain embodiments. Control begins at block 700 with the storage initiator sending a request for a list of storage volumes to either the cloud orchestration services or to a storage target. In block 702, if the request was issued to a storage target, processing continues to block 704, otherwise, the request was issued to the cloud orchestration services, and processing continues to block 706. In block 704, the storage initiator receives a list of GUUIDs that identify the storage volumes from the storage target. In block 706, the storage initiator receives a list of GUUIDs that identify the storage volumes from the cloud orchestration services.

Figure 8:
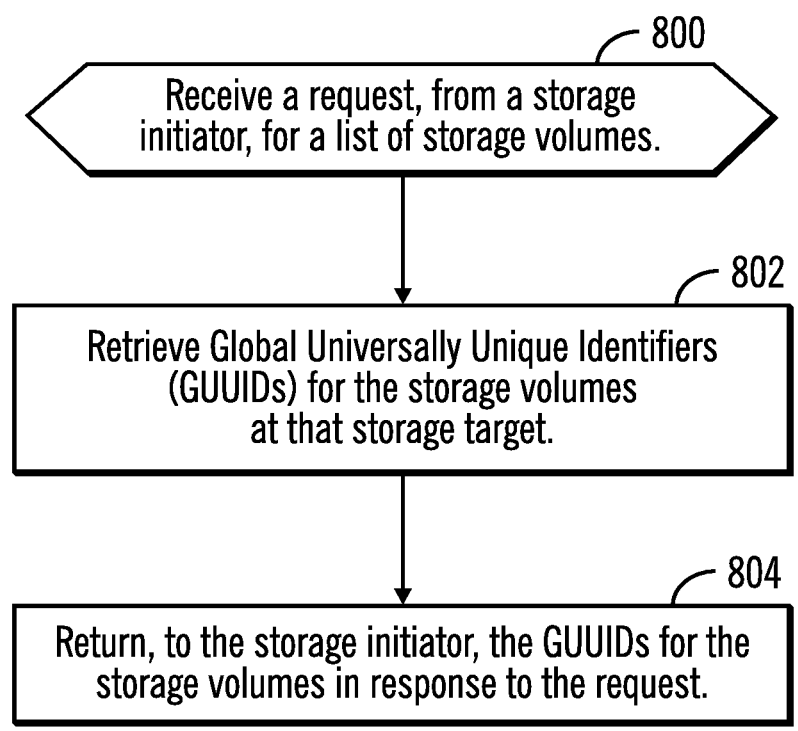
FIG. 8 illustrates, in a flowchart, operations for processing a request for storage volumes, with a storage target, in accordance with certain embodiments.

FIG. 8 illustrates, in a flowchart, operations for processing a request for storage volumes, with a storage target, in accordance with certain embodiments. Control begins in block 800 with a storage target receiving a request, from a storage initiator, for a list of storage volumes. In block 802, the storage target retrieves GUUIDs for the storage volumes at that storage target. In certain embodiments, the storage volumes retrieved may be filtered based on one or more factors (e.g., the request asks for an amount of storage and storage volumes having that amount of storage are returned). In block 804, the storage target returns, to the storage initiator, the GUUIDs for the storage volumes in response to the request.

Figure 9:
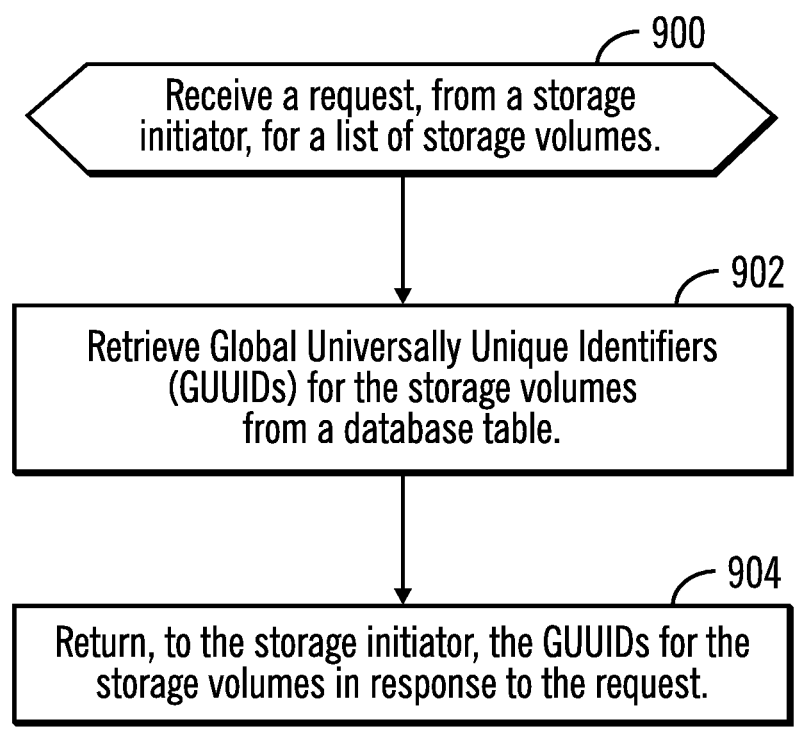
FIG. 9 illustrates, in a flowchart, operations for processing a request for storage volumes, with a cloud management module, in accordance with certain embodiments.

FIG. 9 illustrates, in a flowchart, operations for processing a request for storage volumes, with a cloud orchestration services, in accordance with certain embodiments. Control begins in block 900 with the cloud orchestration services receiving a request, from a storage initiator, for a list of storage volumes. In block 902, the cloud orchestration services retrieve GUUIDs for the storage volumes from a database table. In certain embodiments, the storage volumes retrieved may be filtered based on one or more factors (e.g., the request asks for an amount of storage and storage volumes having that amount of storage are returned). In certain embodiments, the retrieved storage volumes may be at different storage targets. In block 904, the cloud orchestration services returns, to the storage initiator, the GUUIDs for the storage volumes in response to the request.

Figure 10:
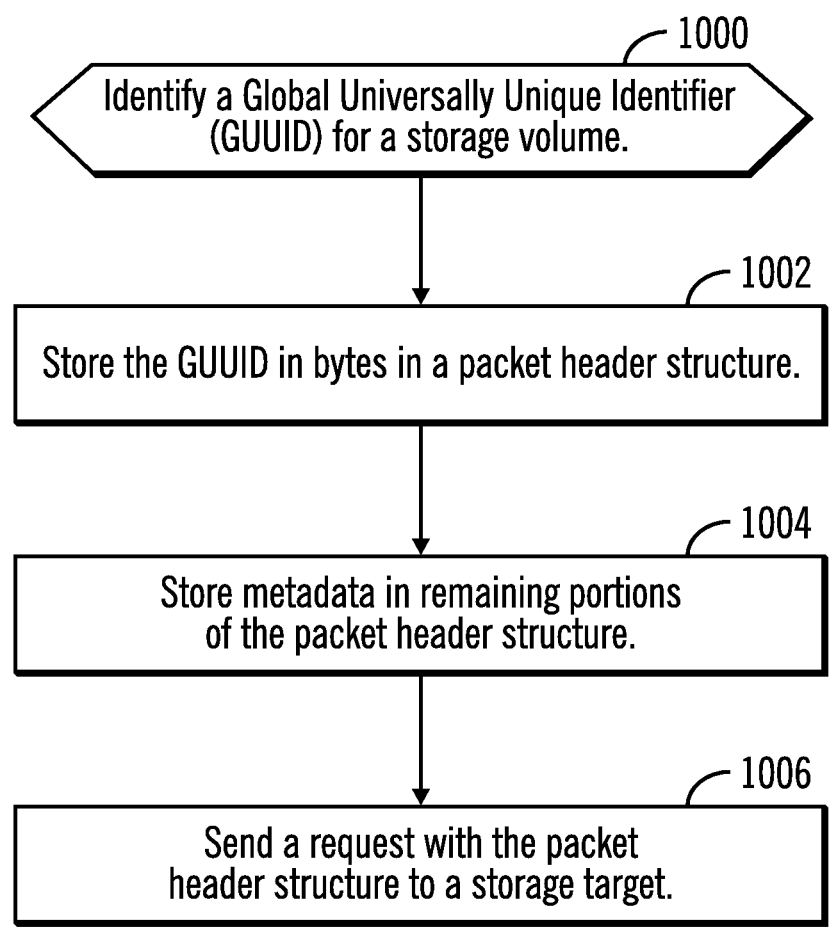
FIG. 10 illustrates, in a flowchart, operations for generating a request, with a storage initiator, in accordance with certain embodiments.

FIG. 10 illustrates, in a flowchart, operations for generating a request, with a storage initiator, in accordance with certain embodiments. Control begins at block 1000 with the storage initiator identifying a GUUID for a storage volume. In block 1002, the storage initiator stores the GUUID in bytes in a packet header structure. In block 1004, the storage initiator stores metadata in remaining portions of the packet header structure. In block 1006, the storage initiator sends a request with the packet header structure to a storage target. For the request, no data may be transferred between the storage initiator and the storage target, the storage initiator may send data to the storage target for storage (in which case the storage initiator sends data to be stored with the packet header structure and the storage target writes data to the storage volume) or the storage initiator may request data from the storage target (in which case the storage target reads data from the storage volume and returns that data with the packet header structure to the storage initiator).

Figure 11:
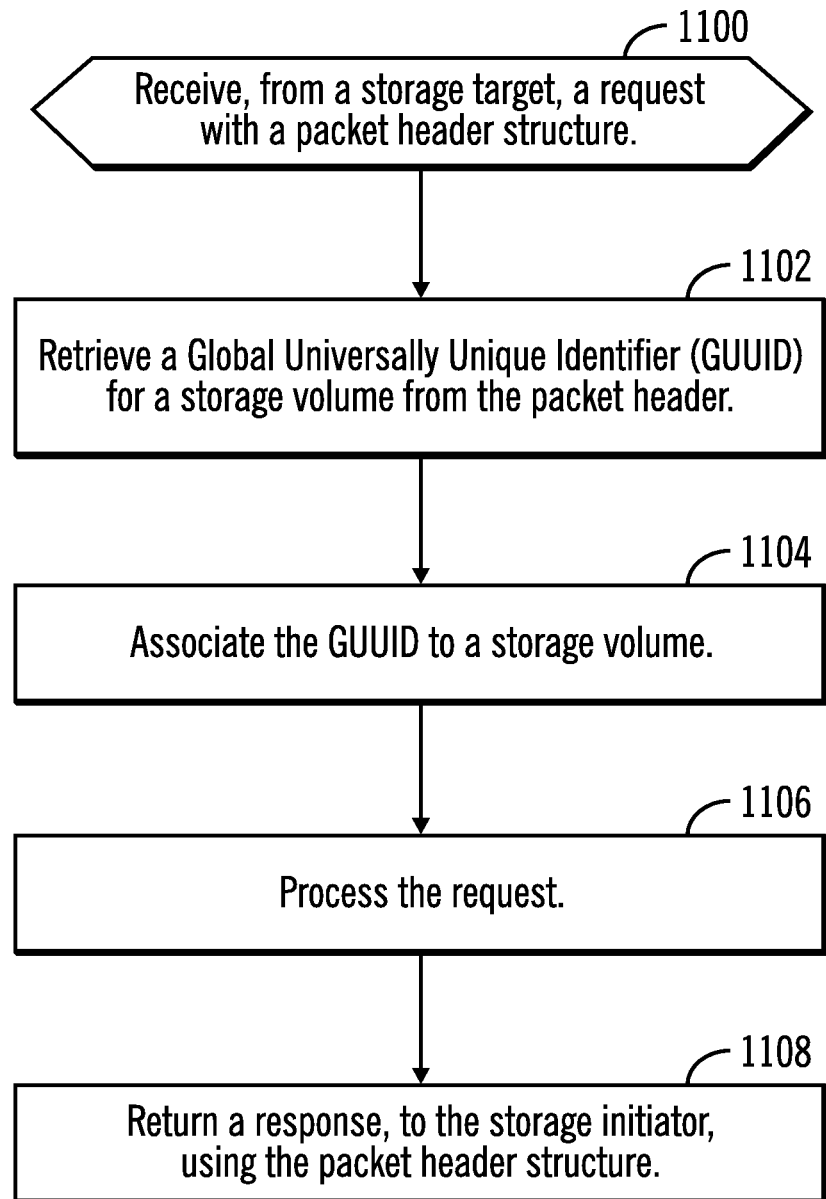
FIG. 11 illustrates, in a flowchart, operations for generating a response, with a storage target, in accordance with certain embodiments.

FIG. 11 illustrates, in a flowchart, operations for generating a response, with a storage target, in accordance with certain embodiments. Control begins at block 1100 with the storage target receiving, from a storage initiator, a request with a packet header structure. In block 1102, the storage target retrieves a GUUID for a storage volume from the packet header. In block 1104, the storage target associates (e.g., maps) the GUUID to a storage volume. In block 1106, the storage target processes the request (e.g., stores data into the storage volume that was included in the request or retrieves data from the storage volume for return to the storage initiator). In block 1108, the storage target returns a response, to the storage initiator, using the packet header structure.

In certain embodiments, the exported AoE network device is presented to an operating system of the storage initiator as a storage block device (e.g., a layer-2 device). A storage block device may be described as a file that provides access to the storage device and allows read/write of data in blocks using device drivers from that storage device. For example, a storage initiator has a device driver that allows the operating system to read/write data from the storage volumes. Sometimes, due to the particular implementation restrictions of an operating system (e.g., a Linux® operating system), there may be practical limitations that may require additional considerations. (Linux is a registered trademark of Linus Torvalds in the United States and/or other countries.)

Certain embodiments provide a volume naming scheme for a Linux® operating system. In a Linux® operating system, network devices are located in the file system under a "/dev/" path. However, the Linux® operating system block devices are limited to 32 characters in total (that is, including the mandatory "/dev/" prefix). In some cases (depending on the protocol and where the block device is exported), there may be other characters in addition to the "/dev/" prefix. This creates a limitation with the use of UUID because the UUID itself requires 32 characters to represent as a string (using the standard Base 16 encoding). Thus, in certain embodiments, the prefix (at least 5 characters) and the UUID (32 characters) are fit into a 32-character long string. There are two options to get around this problem.

That is, in certain embodiments, the UUID string is structured as follows:

| | |
|---|---|
| time_low | 8 (hex digits) integer giving the low 32 bits of the time |
| time_mid | 4 (hex digits) integer giving the middle 16 bits of the time |
| time_high_and_version | 4 (hex digits) 4-bit "version" in the most significant bits, followed by the high 12 bits of the time |
| clock_sequences | 4 (hex digits) 1-3 bit "variant" in the most significant bits, followed by the 13-15 bit clock sequence |
| node | 12 (hex digits) the 48-bit node identifier (ID) |

In a first option, the UUID as represented above is Base 16 (hex) encoded. Instead of using a Base 16 encoding, embodiments use a Base 64 encoding. For example:
(Base 16): 23 aed066-6f9b-43e6-a6e3-f23a2388897f
(Base 64): I67QZm-bQ-am4_I6I4iJfw This is the same representation of a UUID, but only the base changed. As a character representation of the UUID, the Base 64-encoded string is shorter.

i. In a second option, for the purpose of exporting and attaching a network device, embodiments guarantee uniqueness of the path on the local host (the host that is importing the AoE network device). Therefore, it is possible to strip out part of the UUID. For example: consider a UUID with the following format:

ii.

XXXXXXXXYYYYYYYY
XXXXXXXX are the first 8 characters of the GUUID, based on timestamp.
YYYYYYYY are the following 8 characters that contain part of the node ID Embodiments strip the first 8 characters (timestamp based) and keep the following 8 characters (system minor) to guarantee uniqueness of the volume inside the local host. That is, embodiments strip out the first 8 characters (time low), use the next 8 characters (time_mid and time_hi_and_ver) for year, and use the first 8 characters of the node ID.

In certain embodiments, in addition to the storage block device, the Linux® operating system also creates a symlink on "/dev/disk/by-id" using the full GUUID. Using this symlink allows applications to identify the device using the global name.

Thus, embodiments generate a global unique volume identifier for a network storage protocol. The GUUID is used as a volume identifier. Also, the transmission protocol and the addressing format on the storage initiator and storage target are modified to use the GUUID. The use of the GUUID avoids centralized management of volume identifiers.

In certain embodiments, the GGUID is stored with the storage device itself. In certain embodiments, the cloud orchestration services 112 receives the storage volume GUUIDs and stores them in the database 120. In such embodiments, the storage initiator is able to obtain the GUUID from the cloud orchestration services 112 without having to go to the storage target.

Figure 12:
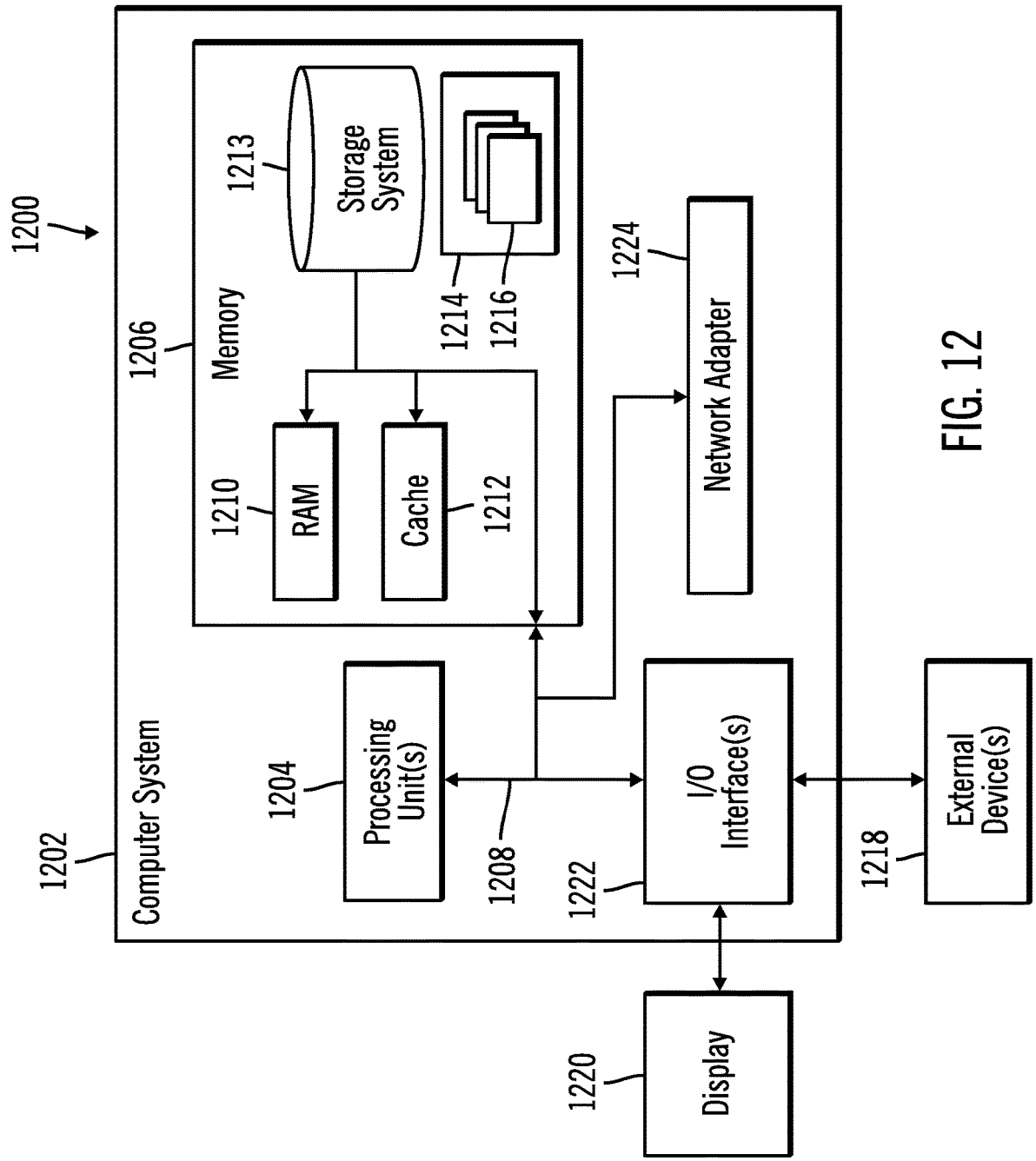
FIG. 12 illustrates a computing architecture in which the components of FIG. 1 may be implemented in accordance with certain embodiments.

FIG. 12 illustrates a computing architecture in which the components of FIG. 1 may be implemented in accordance with certain embodiments. In certain embodiments, the storage initiators 140*a* . . . 140*n*, the storage targets 150*a* . . . 150*m*, and the could management node 110 may implement computer architecture 1200.

Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1211 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where, if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
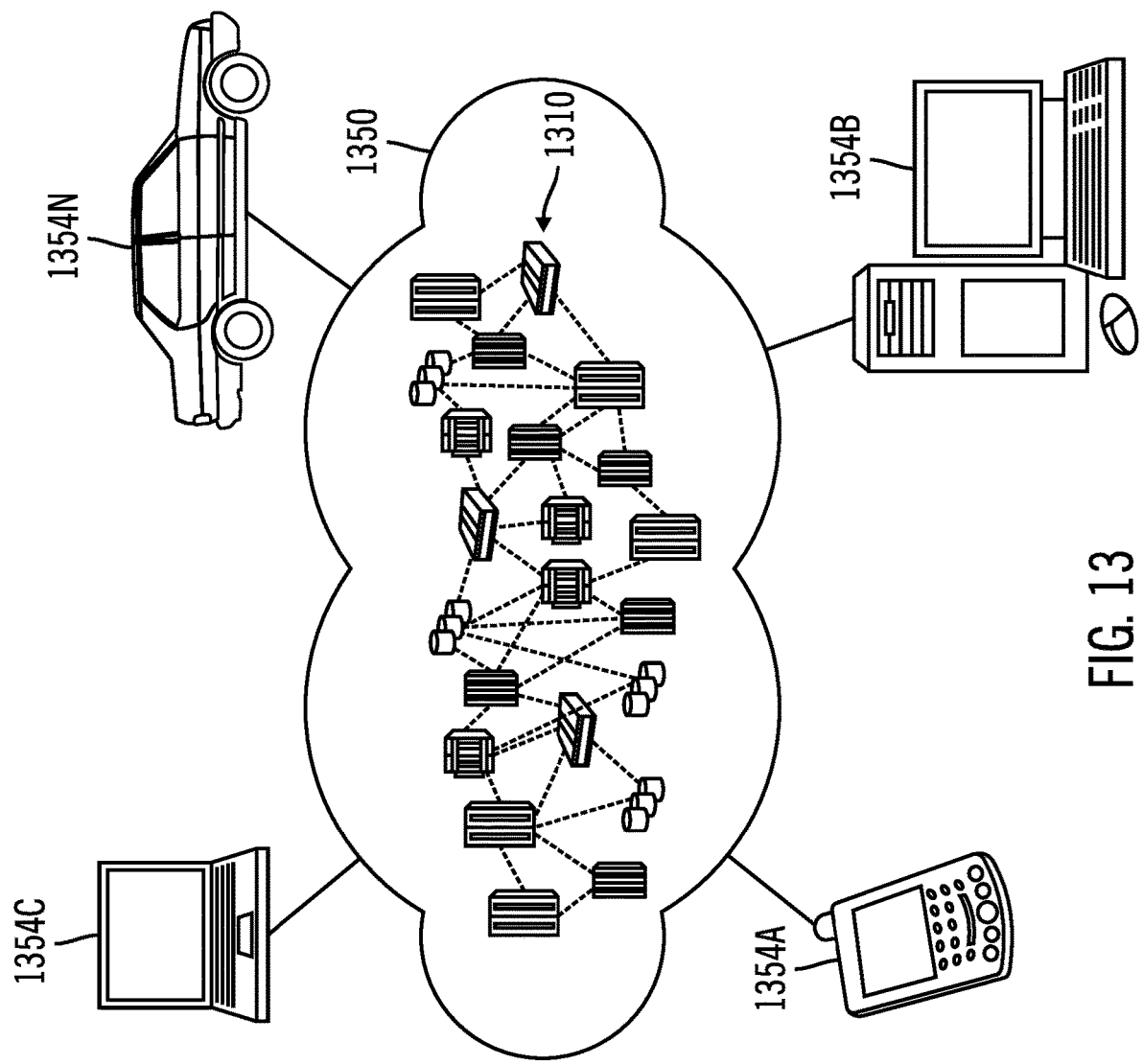
FIG. 13 illustrates a cloud computing environment in accordance with certain embodiments.

Referring now to FIG. 13, illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
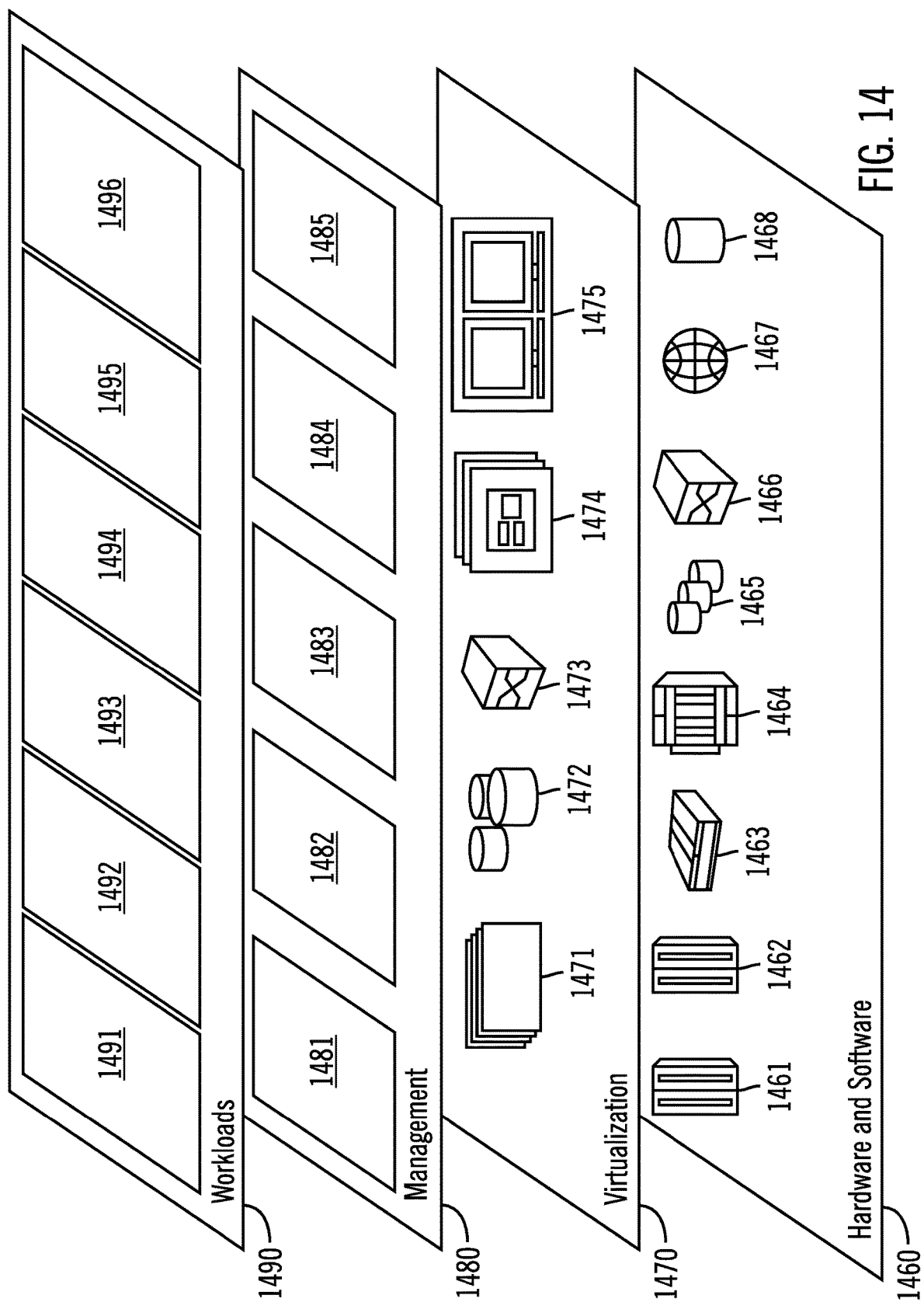
FIG. 14 illustrates abstraction model layers in accordance with certain embodiments.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and providing a global unique identifier for a storage volume 1496.

Thus, in certain embodiments, software or a program, implementing providing a global unique identifier for a storage volume in accordance with embodiments described herein, is provided as a service in a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor of each storage target of a plurality of storage targets to perform:
   in response to creating, at each storage target, each storage volume of a plurality of storage volumes stored in a storage device coupled to that storage target,
      generating a Global Universally Unique Identifier (GUUID) for that storage volume without coordination with other storage targets of the plurality of storage targets; and
      sending the GUUID for storage in a database with metadata, wherein the metadata comprises a path to that storage target;
   in response to receiving, at a first storage target, a request for a first plurality of storage volumes from a storage initiator, providing first GUUIDS of the storage volumes created by the first storage target;
   in response to receiving, at a second storage target, a request for a second plurality of storage volumes from the storage initiator, providing second GUUIDS of the storage volumes created by the second storage target;
   in response to receiving, by one of the first storage target and the second storage target, a request that specifies a GUUID of one of the first GUUIDs and the second GUUIDS in a packet header structure from the storage initiator,
      retrieving the GUUID from the packet header structure;
      associating the GUUID to a storage volume created by that storage target;
      processing the request; and
      returning a response using the packet header structure that specifies the GUUID.

2. The computer program product of claim 1, wherein the request for the first plurality of storage volumes is any one of a request to store data and a request to retrieve data.

3. The computer program product of claim 1, wherein each GUUID of the first GUUIDS and the second GUUIDS is generated when each storage volume of the plurality of storage volumes is created.

4. The computer program product of claim 1, wherein each GUUID of the first GUUIDS and the second GUUIDS is stored in the database with the path to the storage target and a size of the storage volume.

5. The computer program product of claim 1, wherein metadata in remaining portions of the packet header structure includes a source address field, a destination address field, a type field, a version field, a flags field, an error field, a class field, and a tag field.

6. The computer program product of claim 1, wherein each storage target is part of a cloud system, and wherein each storage target generates each GUUID independently.

7. The computer program product of claim 1, wherein the storage initiator requests the first plurality of storage volumes from cloud orchestration services, and wherein the cloud orchestration services provides the first GUUIDS using the database.

8. A plurality of storage targets, wherein each storage target of the plurality of storage targets comprises:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more computer-readable memories, to perform operations comprising:
   in response to creating, at each storage target, each storage volume of a plurality of storage volumes stored in a storage device coupled to that storage target,
      generating a Global Universally Unique Identifier (GUUID) for that storage volume without coordination with other storage targets of the plurality of storage targets; and
      sending the GUUID for storage in a database with metadata, wherein the metadata comprises a path to that storage target;
   in response to receiving, at a first storage target, a request for a first plurality of storage volumes from a storage initiator, providing first GUUIDS of the storage volumes created by the first storage target;
   in response to receiving, at a second storage target, a request for a second plurality of storage volumes from the storage initiator, providing second GUUIDS of the storage volumes created by the second storage target;
   in response to receiving, by one of the first storage target and the second storage target, a request that specifies a GUUID of one of the first GUUIDs and the second GUUIDS in a packet header structure from the storage initiator,
      retrieving the GUUID from the packet header structure;
      associating the GUUID to a storage volume created by that storage target;
      processing the request; and
      returning a response using the packet header structure that specifies the GUUID.

9. The plurality of storage targets of claim 8, wherein the request for the first plurality of first storage volumes is any one of a request to store data and a request to retrieve data.

10. The plurality of storage targets of claim 8, wherein each GUUID of the first GUUIDS and the second GUUIDS is generated when each storage volume of the plurality of storage volumes is created.

11. The plurality of storage targets of claim 8, wherein each GUUID of the first GUUIDS and the second GUUIDS is stored in the database with the path to the storage target and a size of the storage volume.

12. The plurality of storage targets of claim 8, wherein metadata in remaining portions of the packet header structure includes a source address field, a destination address field, a type field, a version field, a flags field, an error field, a class field, and a tag field.

13. The plurality of storage targets of claim 8, wherein each storage target is part of a cloud system, and wherein each storage target generates each GUUID independently.

14. The plurality of storage targets of claim 8, wherein the storage initiator requests the first plurality of storage volumes from cloud orchestration services, and wherein the cloud orchestration services provides the first GUUIDS using the database.

15. A method implemented in each storage target of a plurality of storage targets, comprising:
   in response to creating, at each storage target, each storage volume of a plurality of storage volumes stored in a storage device coupled to that storage target,
      generating a Global Universally Unique Identifier (GUUID) for that storage volume without coordination with other storage targets of the plurality of storage targets; and
      sending the GUUID for storage in a database with metadata, wherein the metadata comprises a path to that storage target;
   in response to receiving, at a first storage target, a request for a first plurality of storage volumes from a storage initiator, providing first GUUIDS of the storage volumes created by the first storage target;
   in response to receiving, at a second storage target, a request for a second plurality of storage volumes from the storage initiator, providing second GUUIDS of the storage volumes created by the second storage target;
   in response to receiving, by one of the first storage target and the second storage target, a request that specifies a GUUID of one of the first GUUIDs and the second GUUIDS in a packet header structure from the storage initiator,
      retrieving the GUUID from the packet header structure;
      associating the GUUID to a storage volume created by that storage target;
      processing the request; and
      returning a response using the packet header structure that specifies the GUUID.

16. The method of claim 15, wherein the request for the first plurality of storage volumes is any one of a request to store data and a request to retrieve data.

17. The method of claim 15, wherein each GUUID of the first GUUIDS and the second GUUIDS is generated when each storage volume of the plurality of storage volumes is created.

18. The method of claim 15, wherein each GUUID of the first GUUIDS and the second GUUIDS is stored in the database with the path to the storage target and a size of the storage volume.

19. The method of claim 15, wherein metadata in remaining portions of the packet header structure includes a source address field, a destination address field, a type field, a version field, a flags field, an error field, a class field, and a tag field.

20. The method of claim 15, wherein each storage target is part of a cloud system, and wherein each storage target generates each GUUID independently.

* * * * *